United States Patent
Nagai et al.

(10) Patent No.: US 9,120,334 B2
(45) Date of Patent: Sep. 1, 2015

(54) IMAGE FORMING APPARATUS AND IMAGE FORMING METHOD

(71) Applicants: Koji Nagai, Kanagawa (JP); Yukitaka Watarai, Kanagawa (JP)

(72) Inventors: Koji Nagai, Kanagawa (JP); Yukitaka Watarai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/596,370

(22) Filed: Jan. 14, 2015

(65) Prior Publication Data
US 2015/0202897 A1  Jul. 23, 2015

(30) Foreign Application Priority Data

Jan. 21, 2014 (JP) .................................. 2014-008312
Nov. 10, 2014 (JP) .................................. 2014-227686

(51) Int. Cl.
| | |
|---|---|
| G01D 11/00 | (2006.01) |
| B41J 11/00 | (2006.01) |
| C09D 11/30 | (2014.01) |
| C09D 11/40 | (2014.01) |
| C09D 11/322 | (2014.01) |

(52) U.S. Cl.
CPC ............ *B41J 11/0015* (2013.01); *C09D 11/30* (2013.01); *C09D 11/322* (2013.01); *C09D 11/40* (2013.01)

(58) Field of Classification Search
CPC ...... C09D 11/30; C09D 11/40; C09D 11/322; C09D 11/54
USPC ................. 347/21, 95, 100; 106/31.13, 31.6; 523/160, 201, 205
See application file for complete search history.

(56) References Cited

U.S. PATENT DOCUMENTS

| | | | |
|---|---|---|---|
| 8,109,622 B2 * | 2/2012 | Goto et al. ..................... 347/100 |
| 8,960,878 B2 * | 2/2015 | Ichinose et al. ............... 347/100 |
| 2009/0290007 A1 | 11/2009 | Saitoh et al. | |
| 2010/0309260 A1 | 12/2010 | Hakiri et al. | |

FOREIGN PATENT DOCUMENTS

| | | |
|---|---|---|
| JP | 2009-173805 | 8/2009 |
| JP | 2009-279796 | 12/2009 |
| JP | 2012-107210 | 6/2012 |
| JP | 2013-139524 | 7/2013 |

* cited by examiner

*Primary Examiner* — An Do
(74) *Attorney, Agent, or Firm* — Cooper & Dunham LLP (57) ABSTRACT

Provided is an image forming apparatus, including: a pretreatment unit configured to bring a surface of a recording medium into contact with plasma; and an image forming unit configured to eject an ink onto the recording medium to thereby form an image; wherein the ink contains a pigment, water, a water-soluble organic solvent, and resin particles, wherein the water-soluble organic solvent is an amide compound having an inorganic/organic value (I/O value) of 1.1 to 2.0, and wherein the resin particles are ether-based polyurethane resin particles and have an acid group amount of 2.0 meq/g or more.

12 Claims, 4 Drawing Sheets

IMAGE FORMING APPARATUS AND IMAGE FORMING METHOD

BACKGROUND OF THE INVENTION

1. Field of the Invention

The present invention relates to an image forming apparatus and an image forming method.

2. Description of the Related Art

A recording medium for offset printing (hereinafter referred to as offset coat paper) including a support mainly made of cellulosic fiber and a coating layer applied onto at least one surface of the support is cheaper than a recording medium for inkjet printing. Therefore, the offset coat paper is demanded to be applied to inkjet image forming technology.

However, in the case where a conventional aqueous ink for inkjet printing is applied onto a sheet of the offset coat paper, the ink is not absorbed into the sheet and is spread over a surface of the sheet, resulting in failure called as beading. The beading is a phenomenon in which adjacent dots having to be discrete coalesce together.

In order to improve the beading, there has been known technology for increasing hydrophilicity of a recording medium through plasma pretreatment thereof to thereby improve permeability of an ink (Japanese Patent Application Laid-Open (JP-A) No. 2009-279796).

Meanwhile, for the purpose of improving image quality, an ink containing an anionic self-emulsifying polyurethane resin particle has been known (JP-A No. 2009-173805 (Japanese Patent (JP-B) No. 5196235)).

JP-A No. 2013-139524 discloses an ink containing a compound selected from the group consisting of methoxy propionic amide, butoxy propionic amide, dioxolane alcohol, and oxetane alcohol.

JP-A No. 2012-107210 proposes an ink which contains a water-soluble organic solvent consisting of an amide compound.

SUMMARY OF THE INVENTION

An object of the present invention is to provide an image forming apparatus without causing beading even when low-energy plasma pretreatment is performed.

A means for solving the above problem is as follows.

An image forming apparatus, including:

a pretreatment unit configured to bring a surface of a recording medium into contact with plasma; and an image forming unit configured to eject an ink onto the recording medium to thereby form an image;

wherein the ink contains a pigment, water, a water-soluble organic solvent, and resin particles, wherein the water-soluble organic solvent is an amide compound having an inorganic/organic value (I/O value) of 1.1 to 2.0, and wherein the resin particles are ether-based polyurethane resin particles and have an acid group amount of 2.0 meq/g or more.

The present invention can provide an image forming apparatus without causing beading even when low-energy plasma pretreatment is performed.

DETAILED DESCRIPTION OF THE INVENTION (Image Forming Apparatus and Image Forming Method)

An image forming apparatus of the present invention includes a pretreatment unit configured to bring a surface of a recording medium into contact with plasma, an image forming unit configured to eject an ink onto the recording medium to thereby form an image; and, if necessary, further includes other units.

An image forming method of the present invention includes a pretreatment step of bringing a surface of a recording medium into contact with plasma, an image forming step of ejecting an ink onto the recording medium to thereby form an image; and, if necessary, further includes other steps.

In the present invention, the ink contains at least a pigment, water, a water-soluble organic solvent, and resin particles, the water-soluble organic solvent is an amide compound having an inorganic/organic value (I/O value) of 1.1 to 2.0, and the resin particles is ether-based polyurethane resin particles and has an acid group amount of 2.0 meq/g or more.

As described above, use of an inkjet ink according to the present invention prevents beading and achieves excellent printability when using not only a recording medium such as plain paper but also a recording medium of which surface is coated with a resin material such as offset coat paper. Additionally, responsiveness to plasma pretreatment is suitably achieved, so that energy for the pretreatment can be reduced. The pretreatment has effects of improving color development of the ink and decreasing an ink deposit amount.

That is, the plasma pretreatment has the following effects: (1) a hydrophilic functional group (—OH, —CHO, —COOH) produced through a reaction of a molecule on a surface layer of a recording medium (e.g., resin contained in a coating layer on the recording medium) hydrophilizes a surface of the medium; (2) plasma physically roughens the surface of the medium to thereby improve permeability of a solvent; and (3) a functional group —COOH produced through repeated treatments decreases the pH value of (acidifies) the surface of the medium, during which H+ is produced to thereby cause charged particles in the ink to agglomerate.

The pretreatment unit used in the present invention can bring a surface of a recording medium into contact with plasma to thereby decrease a pH value of the surface.

(i) The ink of the present invention contains ether-based polyurethane resin particles having an acid group amount of 2.0 [meq/g] or more. Such ether-based polyurethane resin particles are highly hydrophilic and therefore have good separability from a solvent component. A highly hydrophilic resin component is likely to separate from the solvent which permeates the inside of a coat layer and remain on the surface of the medium.

(ii) In addition, the ink of the present invention contains the water-soluble organic solvent which is the amide compound having the I/O value of 1.1 to 2.0. Such an amide compound is highly lipophilic while being water-soluble. Therefore, the amide compound is likely to permeate a resin material layer of the recording medium of which surface is coated with a resinic material (e.g., offset coat paper). Roughening of the surface of the medium further accelerates permeation of the solvent.

(iii) The pretreatment unit used in the present invention can bring a surface of a recording medium into contact with plasma to thereby decrease a pH value of the surface. An acidic functional group formed on the surface of the recording medium causes the pigment and the resin component on the surface of the recording medium to agglomerate, which promotes separation thereof from the solvent component.

The ink according to the present invention can improve an effect of the plasma pretreatment, so that energy for the pretreatment can be reduced.

[Image Forming Apparatus (Printing Device, Printing System)]

Figure 1:
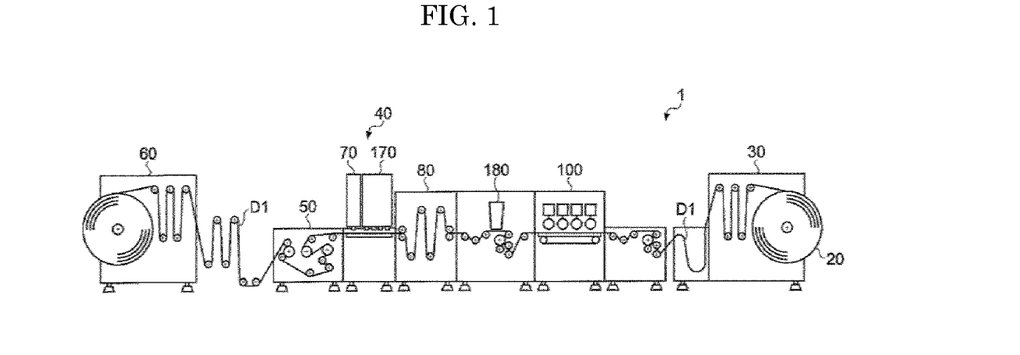
FIG. 1 is one exemplary diagram illustrating an image forming apparatus (printing device, printing system 1) and an image forming method of the present invention.

FIG. 1 is one exemplary diagram illustrating an image forming apparatus (printing device, printing system 1) and an image forming method of the present invention.

The printing device (system 1) includes a carry-in section 30 configured to carry-in (convey) a treatment object 20 (roll sheet) along a conveyance path D1; a plasma treatment unit (device) 100 configured to treat the carried treatment object 20 with plasma as pretreatment; and an image forming section 40 configured to form an image on the surface of the treatment object 20 which has been treated with plasma. A buffer section 80 is provided between the plasma treatment device 100 and an inkjet recording device (image forming unit) 170 and configured to adjust a feed amount of the treatment object 20 which has been subjected to the pretreatment (e.g., plasma treatment) to the inkjet recording device 170. The image forming section 40 includes the inkjet recording device 170 configured to form an image through an inkjet recording process on the treatment object 20 which has been subjected to the plasma treatment. The image forming section 40 may also include a post-processing section 70 configured to perform post-processing on the treatment object 20 on which the image is formed.

Note that, the printing device (system 1) may include a drying section 50 configured to dry the treatment object 20 which has been subjected to the post-processing; and a carry-out section 60 configured to carry-out the treatment object 20 on which the image is formed (in some cases, which has also been subjected to the post-processing). The printing device (system 1) may further include, as a pretreatment section configured to pretreat the treatment object 20, a primer treatment section (not illustrated) configured to apply a treatment liquid called as a primer and containing a polymer material onto the surface of the treatment object 20, in addition to the plasma treatment device 100.

A pH detection section 180 may be further provided between the plasma treatment device 100 and the image forming section 40, and is configured to detect the pH value on the surface of the treatment object 20 which has been subjected to pretreatment by the plasma treatment device 100.

Moreover, the printing device (system 1) includes a control section (not illustrated) configured to control operation of each of the sections. This control section may be connected to a printing control device configured to generate raster data from, for example, image data of a printing object. The printing control device may be provided on the interior of the printing device (system) 1 or provided externally via internet or LAN (Local Area Network).

According to this embodiment, in the printing device (system) 1 illustrated in FIG. 1, the surface of the treatment object is treated in advance before the inkjet recording process, as described above. Atmospheric pressure non-equilibrium plasma treatment using dielectric barrier discharge may be employed as the treatment.

The treatment with the atmospheric pressure non-equilibrium plasma is one of preferable plasma treatment methods for a treatment object, such as a recording medium, because the electron temperature is extremely high and the gas temperature is close to an ordinary temperature.

In order to stably generate the atmospheric pressure non-equilibrium plasma over a wide range, it is preferable to perform the atmospheric pressure non-equilibrium plasma treatment employing dielectric barrier discharge in a streamer dielectric breakdown manner. The dielectric barrier discharge in a streamer dielectric breakdown manner can be achieved by, for example, applying an alternating high-voltage between electrodes covered with a dielectric body.

Note that, various methods other than the above-described dielectric barrier discharge in a streamer dielectric breakdown manner may be employed to generate the atmospheric pressure non-equilibrium plasma. For example, dielectric barrier discharge in which an insulator (e.g., dielectric body) is inserted between electrodes; corona discharge in which a highly non-uniform electric field is formed on, for example, a thin metal wire; or pulse discharge in which a short pulse voltage is applied may be used. Furthermore, two or more of the above methods may be combined.

[Plasma Treatment Unit (Device)]

Figure 2:
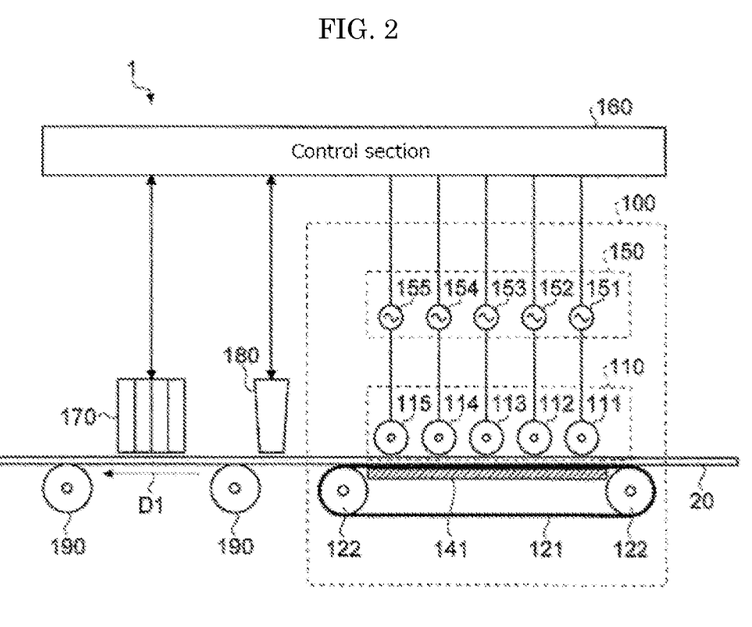
FIG. 2 is one exemplary diagram illustrating a plasma treatment unit (treatment device) and a plasma treatment step in the image forming apparatus.

The printing device (system) 1 includes the plasma treatment device 100 configured to treat the surface of the treatment object 20 with plasma; the pH detection section 180 configured to measure the pH value of the surface of the treatment object 20; the inkjet recording device 170 configured to form an image through inkjet printing on the treatment object 20; and the control section 160 configured to control the printing device (system) 1 entirely. The printing device (system) 1 further includes a conveyance roller 190 configured to convey the treatment object 20 along the conveyance path D1. The conveyance roller 190 is configured to be rotationally driven according to control of the control section 160 to thereby convey the treatment object 20 along the conveyance path D1.

The plasma treatment device 100 includes a discharge electrode 110, a counter electrode 141, a high-frequency high-voltage power supply 150, and a dielectric belt 121 which is sandwiched between the electrodes. However, in FIG. 2, the discharge electrode 110 is composed of 5 discharge electrodes 111 to 115, and the counter electrode 141 is provided throughout an area opposed to the discharge electrodes 111 to 115 across the dielectric belt 121. The high-frequency high-voltage power supply 150 is composed of 5 high-frequency high-voltage power supplies 151 to 155 corresponding to the number of the discharge electrodes 111 to 115.

The dielectric belt 121 may preferably be an endless belt so as to also serve as a conveyance path of the treatment object 20. Therefore, the plasma treatment device 100 further includes a rotating roller 122 configured to allow the dielectric belt 121 to rotate to thereby convey the treatment object 20. The rotating roller 122 is rotationally driven according to a command from the control section 160 to thereby allow the dielectric belt 121 to rotate.

Thus, the treatment object 20 is conveyed along the conveyance path D1.

The control section 160 can individually turn on and off the high-frequency high-voltage power supplies 151 to 155. The control section 160 can also adjust the pulse intensity of the high-frequency high-voltage pulse to be supplied from the high-frequency high-voltage power supplies 151 to 155 to the discharge electrodes 111 to 115. For example, the control section selects the number of the high-frequency high-voltage power supplies 151 to 155 to be driven, or adjusts the plasma energy intensity of the pulse voltage to be applied to each of the discharge electrodes 111 to 115, based on printing speed information. Alternatively, the control section 160 may adjust the number of the high-frequency high-voltage power supplies 151 to 155 to be driven and/or the plasma energy to be applied to each of the discharge electrodes 111 to 115, in accordance with the type of the treatment object 20 (e.g., coat paper or PET film).

The treatment object 20 is subjected to the plasma treatment by passing through between the discharge electrode 110 and the dielectric belt 121 during plasma generation in the plasma treatment device 100. Thus, a chain of a binder resin on the surface of the treatment object 20 is cleaved, and oxygen radical or ozone in a gas phase rebinds with a polymer. As a result, a polar functional group is formed on the surface of the treatment object 20. Consequently, the surface of the treatment object 20 is hydrophilized and acidified. Note that, in this context, the plasma treatment is performed in the air, but may be performed in a gas atmosphere such as nitrogen or a rare gas.

Inclusion of a plurality of the discharge electrodes 111 to 115 is also effective for uniformly acidifying the surface of the treatment object 20. Specifically, at the same conveying speed (printing speed), acidification with the plurality of the discharge electrodes can prolong the period of time for the treatment object 20 to pass through a plasma space relative to acidification with a single discharge electrode, making it possible to hydrophilize and acidify the surface of the treatment object 20 more uniformly.

The inkjet recording device 170 includes an inkjet head. The inkjet head include a plurality of heads for the same color (in this case, 4 colors×4 heads), for example, for the purpose of accelerating the printing speed. In order to form an image with high resolution (e.g., 1,200 dpi) at high speed, ink ejecting nozzles of the heads for each of colors are displaced from one another so as to correct a gap between the nozzles. Furthermore, the inkjet head can be driven with a plurality of drive frequencies so that ink dots (droplets) ejected from each of the nozzles correspond to three different sizes of a large droplet, a medium droplet, and a small droplet.

The inkjet head of the inkjet recording device 170 may include a plurality of heads for the same color (4 colors×4 heads). With this configuration, the inkjet recording process can be accelerated. For example, in order to achieve the resolution of 1,200 dpi at high speed, the heads of each of colors in the inkjet head are displaced from one another so as to correct a gap between nozzles for ejecting inks. Furthermore, drive pulses with various drive frequencies are input to the heads of each of colors so that an ink dot ejected from the nozzle can correspond to three different sizes of a large droplet, a medium droplet, and a small droplet.

The inkjet head is provided downstream of the plasma treatment device 100 in the conveyance path of the treatment object 20. The inkjet recording device 170 forms an image by ejecting an ink onto the treatment object 20 which has been pretreated (acidified) by the plasma treatment device 100 under the control of the control section 160.

One method to obtain the plasma energy needed to perform necessary and sufficient plasma treatment on the surface of the treatment object 20 may be to prolong the period of time of the plasma treatment. This can be achieved by, for example, decreasing the conveying speed of the treatment object 20. However, in the case where an image is recorded on the treatment object 20 at high speed, it is desirable to shorten the period of time of the plasma treatment. As mentioned above, examples of a method to shorten the period of time of the plasma treatment include, but not limited thereto, a method in which the plurality of the discharge electrodes 111 to 115 are provided, and the necessary number of the discharge electrodes 111 to 115 is driven in accordance with the printing speed or a method in which the plurality of the discharge electrodes are provided, and the plasma energy intensity to be applied to each of the discharge electrodes 111 to 115 is increased in accordance with necessary plasma energy. However, the methods may be changed appropriately by combining the above methods or by applying other methods.

For example, the number of the high-frequency high-voltage power supplies 151 to 155 to be driven may be selected, or the pulse intensity of the high-frequency high-voltage pulse to be supplied from the high-frequency high-voltage power supplies 151 to 155 to the discharge electrodes 111 to 115 may be adjusted, based on the printing speed information. These may be performed in combination. Note that, the printing speed information may be information on a printing mode of the inkjet recording device 170 (e.g., color printing or monochrome printing, and resolution), or information on rotating speed and throughput of the conveyance roller 190 derived therefrom. The pulse intensity corresponds to plasma energy, and may be a frequency or a voltage value (amplitude) of the high-frequency high-voltage pulse, or a control value derived from the above-described parameters.

Regardless of the conveyance speed, in order to attain a necessary and sufficient pretreatment effect depending on the conveyance speed, large plasma energy is needed. In the case where the need is implemented by modifying a device, the device is required to have a larger-sized power supply and electrode. The device and reduced electric power consumption can be achieved by improving responsiveness of the ink to the pretreatment. The ink used in the present invention will now be described.

[Ink]

An ink used in the present invention contains a pigment, water, a water-soluble organic solvent, and resin particles; preferably contains a surfactant; and, if necessary, further contains other components.

<Water-Soluble Organic Solvent>

The water-soluble organic solvent contains at least one of amide compounds represented by the following General Formula (I):

General Formula (I)

In the General Formula (I), R denotes an alkyl group having 1 to 6 carbon atoms, preferably an alkyl group having 1 to 4 carbon atoms.

Examples of the amide compounds represented by the General Formula (I) include the following compound:

Structural Formula (2)

Structural Formula (3)

The amide compounds may be selected from alkyl groups having 1 to 6 carbon atoms and having the I/O value falling within the range of 1.1 to 2.0. The I/O value means a ratio of an inorganic value I to an organic value O in a compound, and derived from the numbers of carbon atoms and various functional groups (e.g., carbonyl group or amino group) in the compound.

For example, in the case of the amide compound represented by the Structural Formula (2), a total organic value is 130, which is the sum of organic values of (i) 6 carbon atoms each having the organic value of 20, (ii) one substituent [—CH$_2$CH$_2$—O—] having the organic value of −10, and (iii) one substituent —NC having the organic value of 20; and a total inorganic value is 255, which is the sum of inorganic values of (i) one ether group —O— having the inorganic value of 20, (ii) one carbonyl group >C=O having the inorganic value of 65, (iii) one amino group —N< having the inorganic value of 70, (iv) one substituent [—CH$_2$CH$_2$—O—] having the inorganic value of 60, and (v) one substituent —NC having the inorganic value of 40. As a result, the I/O value of the amide compound is determined as 255/130, that is, the I/O value is 1.96.

The I/O value of the amide compound represented by the Structural Formula (3) is calculated in the same manner. A total organic value thereof is 190, which is the sum of organic values of (i) 9 carbon atoms each having the organic value of 20, (iii) one substituent [—CH$_2$CH$_2$—O—] having the organic value of −10, and (iv) one substituent —NC having the organic value of 20; and a total inorganic value is 255 which is the same as that of the amide compound represented by the Structural Formula (2). As a result, the I/O value of the amide compound is determined as 255/190, that is, the I/O value is 1.34.

The I/O value is calculated using "EXCEL spread sheet for organic conceptual diagram" created by Yoshio Honma who is the author of "New Edition Organic Conceptual Diagram Foundation and Application," by Yoshio Koda, Shiro Sato, and Yoshio Honma, published by SANKYO PUBLISHING Co., Ltd., 2008. Generally, the higher the inorganic value I is, the higher the hydrophilic degree is; and the higher the organic value O is, the higher the lipophilic degree is.

The amide compound having the I/O value falling within the range of 1.1 to 2.0 is water-soluble and also highly lipophilic because many hydrophobic functional groups bind thereto. Meanwhile, the resin particles are highly hydrophilic because of a large acid group amount. Therefore, the water-soluble organic solvent has good separability from the resin particles. The separability is further increased by increasing hydrophilicity of the surface of the recording medium through the pretreatment with plasma. As a result, the resin component and a solid pigment component remain on the surface of the recording medium, and, on the other hand, a solvent component permeates the coat layer. Meanwhile, the surface of the recording medium is roughened through the pretreatment with plasma, so that permeation of a liquid component is accelerated. The water-soluble organic solvent is highly lipophilic and has a low surface tension, so that roughening the surface of the recording medium further accelerates permeation of the solvent. Additionally, the extent of separation of the solvent from a resin component and the solid pigment component is dramatically improved. Use of an ink effective for the pretreatment process with plasma dramatically improves the beading resulting from bleeding of the liquid component on the surface of the recording medium. Therefore, an equivalent effect to conventional one can be achieved with lower pretreatment energy.

The number of carbon atoms contained in the R of the amide compound represented by the General Formula (I) is preferably 1 to 6, more preferably 1 to 4. The I/O value of the amide compound is preferably 1.1 to 2.0, more preferably 1.3 to 2.0.

An amount of the amide compound contained in the ink is preferably 1% by mass to 40% by mass, more preferably 2% by mass to 30% by mass. In the case of the amount falling within the above-described range, the ink having excellent separability and permeability can be obtained, making it possible to reduce the pretreatment energy. Additionally, the ink having excellent storage stability and ejection stability can be provided.

Moreover, alkyl alkane diol may be used as a water-soluble organic solvent having an auxiliary effect. The alkyl alkane diol may be anyone, as long as it has an alkane diol having 3 to 5 carbon atoms as a backbone and an alkyl group having 1 to 2 carbon atoms as a side chain. The above-described alkyl alkane diol is water-soluble and rich in lipophilic group in terms of the hydrophilic group-lipophilic group balance, so that, in the case where the medium which has been pretreated with plasma is used, it has better separability from the resin particles and the solid pigment component and has better permeability into the roughened surface of the recording medium.

Examples of the auxiliary water-soluble organic solvent include 3-methyl-1,5-pentanediol, and 3-methyl-1,3-butanediol.

An amount of the alkane diol contained in the ink is preferably 2% by mass to 40% by mass, more preferably 5% by mass to 30% by mass. In the case of the amount falling within the above-described range, the ink having excellent separability and permeability can be obtained, making it possible to reduce the pretreatment energy. Additionally, the ink having excellent storage stability and ejection stability can be provided.

<Other Water-Soluble Organic Solvents>

Other water-soluble organic solvents may be added in order to improve moisture retaining property of the ink, retard drying of the nozzle in the inkjet head to thereby ensure ejection stability, and prevent a waste ink from adhering to a maintaining device. The other water-soluble organic solvents may be used in combination of two or more solvents having different properties.

Examples of a water-soluble organic solvent having the boiling point of higher than 250° C. at normal pressure include 1,2,3-butanetriol (bp: 175° C./33 hPa, 38% by mass), 1,2,4-butanetriol (bp: 190° C. to 191° C./24 hPa, 41% by mass), glycerin (bp: 290° C., 49% by mass), diglycerin (bp:

270° C./20 hPa, 38% by mass), triethylene glycol (bp: 285° C., 39% by mass), and tetraethylene glycol (bp: 324° C. to 330° C., 37% by mass).

Examples of a water-soluble organic solvent having the boiling point of 140° C. to 250° C. include diethylene glycol (bp: 245° C., 43% by mass), and 1,3-butanediol (bp: 203° C. to 204° C., 35% by mass).

Examples of the other water-soluble organic solvents include polyhydric alcohols, polyhydric alcohol alkyl ethers, polyhydric alcohol aryl ethers, nitrogen-containing heterocyclic compounds, amides, amines, sulfur-containing compounds, propylene carbonate, and ethylene carbonate.

Examples of the polyhydric alcohols include dipropylene glycol (bp: 232° C.), 1,5-pentanediol (bp: 242° C.), propylene glycol (bp: 187° C.), 2-methyl-2,4-pentanediol (bp: 197° C.), ethylene glycol (bp: 196° C. to 198° C.), tripropylene glycol (bp: 267° C.), hexylene glycol (bp: 197° C.), polyethylene glycol (viscous liquid to solid), polypropylene glycol (bp: 187° C.), 1,6-hexanediol (bp: 253° C. to 260° C.), 1,2,6-hexanetriol (bp: 178° C.), trimethylolethane (solid, mp: 199° C. to 201° C.), and trimethylolpropane (solid, mp: 61° C.).

Examples of the polyhydric alcohol alkyl ethers include ethylene glycol monoethyl ether (bp: 135° C.), ethylene glycol monobutyl ether (bp: 171° C.), diethylene glycol monomethyl ether (bp: 194° C.), diethylene glycol monoethyl ether (bp: 197° C.), diethylene glycol monobutyl ether (bp: 231° C.), ethylene glycolmono-2-ethylhexylether (bp: 229° C.), and propylene glycol monoethyl ether (bp: 132° C.).

Examples of the polyhydric alcohol aryl ethers include ethylene glycol monophenyl ether (bp: 237° C.), and ethylene glycol monobenzyl ether.

Examples of the nitrogen-containing heterocyclic compounds include 2-pyrrolidone (bp: 250° C., mp: 25.5° C., 47% by mass to 48% by mass), N-methyl-2-pyrrolidone (bp: 202° C.), 1,3-dimethyl-2-imidazolidinone (bp: 226° C.), ∈-caprolactam (bp: 270° C.), and γ-butyrolactone (bp: 204° C. to 205° C.).

Examples of the amides include formamide (bp: 210° C.), N-methylformamide (bp: 199° C. to 201° C.), N,N-dimethylformamide (bp: 153° C.), and N,N-diethylformamide (bp: 176° C. to 177° C.).

Examples of the amines include monoethanolamine (bp: 170° C.), diethanolamine (bp: 268° C.), triethanolamine (bp: 360° C.), N,N-dimethylmonoethanolamine (bp: 139° C.), N-methyldiethanolamine (bp: 243° C.), N-methylethanolamine (bp: 159° C.), N-phenylethanolamine (bp: 282° C. to 287° C.), and 3-aminopropyldiethylamine (bp: 169° C.).

Examples of the sulfur-containing compounds include dimethylsulfoxide (bp: 139° C.), sulfolane (bp: 285° C.), and thiodiglycol (bp: 282° C.).

<Resin Emulsion and Preparation Method Thereof>

The ink of the present invention contains ether-based polyurethane resin particles.

The ether-based polyurethane resin particles are preferably added as ether-based polyurethane resin emulsion when preparing the ink.

A method for synthesizing the polyurethane resin emulsion is not particularly limited and may be appropriately selected depending on the intended purpose. For example, the following methods may be used.

(1) A polyfunctional isocyanate compound is reacted with a compound having two or more active hydrogen groups capable of reacting with an isocyanate group, a compound having an active hydrogen group capable of reacting with an isocyanate group and having a carboxyl group and a sulfonyl group in the molecule thereof, or both thereof; and a compound having an active hydrogen group capable of reacting with an isocyanate group and having a cationic group in the molecule thereof at an equivalence ratio with excess of the isocyanate group and in the presence or absence of an organic solvent, to thereby produce a urethane prepolymer having a terminal isocyanate group. The carboxyl group, the sulfonyl group, or both thereof in the urethane prepolymer is neutralized with a neutralizing agent. Then, thus-neutralized urethane prepolymer is charged into an aqueous solution containing a chain extender, followed by emulsifying and subjecting to a chain extension reaction. Thereafter, in the case where the organic solvent is contained in the reaction system, the organic solvent is removed to thereby obtain an aqueous polyurethane resin.

(2) The unneutralized urethane prepolymer in the method of (1) is charged into an aqueous solution containing a neutralizing agent and a chain extender, followed by emulsifying and subjecting to a chain extension reaction to thereby obtain an aqueous polyurethane resin.

(3) The neutralized urethane prepolymer in the method of (1) is added with a chain extender and water, to thereby obtain an aqueous polyurethane resin.

(4) The unneutralized urethane prepolymer in the method of (1) is added with a neutralizing agent, a chain extender, and water, to thereby obtain an aqueous polyurethane resin.

(5) The neutralized urethane prepolymer in the method of (1) is charged into water, followed by adding an emulsifier and a chain extender thereto to thereby obtain an aqueous polyurethane resin.

(6) The unneutralized urethane prepolymer in the method of (1) is charged into an aqueous solution containing a neutralizing agent, followed by adding a chain extender thereto to thereby obtain an aqueous polyurethane resin.

(7) The neutralized urethane prepolymer in the method of (1) is added with water and then with a chain extender to thereby obtain an aqueous polyurethane resin.

(8) The unneutralized urethane prepolymer in the method of (1) is added with an aqueous solution containing a neutralizing agent and then with a chain extender to thereby obtain an aqueous polyurethane resin.

In the present invention, a hydrophilic group (e.g., carboxylic acid) and a functional group serving as an emulsifier is introduced through, for example, copolymerization in a synthesis process of the polyurethane resin, resulting in polyurethane resin emulsion.

An amount of the carboxylic acid to be introduced affects the acid group amount of the resin. In the present invention, in accordance with the method for measuring the acid group amount of resin described in JP-A No. 2007-3454, the following method is used to measure the acid group amount.

Firstly, 5 g of a sample is weighed into a 200 mL beaker, to which 25 mL of 0.2 N NaOH is added.

The sample is added with ion-exchanged water so as to give a total volume of 50 mL.

The sample is stirred with a stirring bar on a magnetic stirrer.

An electrode of a pH meter is placed into the sample, to which 0.2 N HCl is added dropwise while stirring with the stirrer.

An added amount of HCl and pH change are recorded. The acid group amount is calculated from the resultant added amounts of HCl required to reach the first equivalent point and the second equivalent point.

Figure 3:
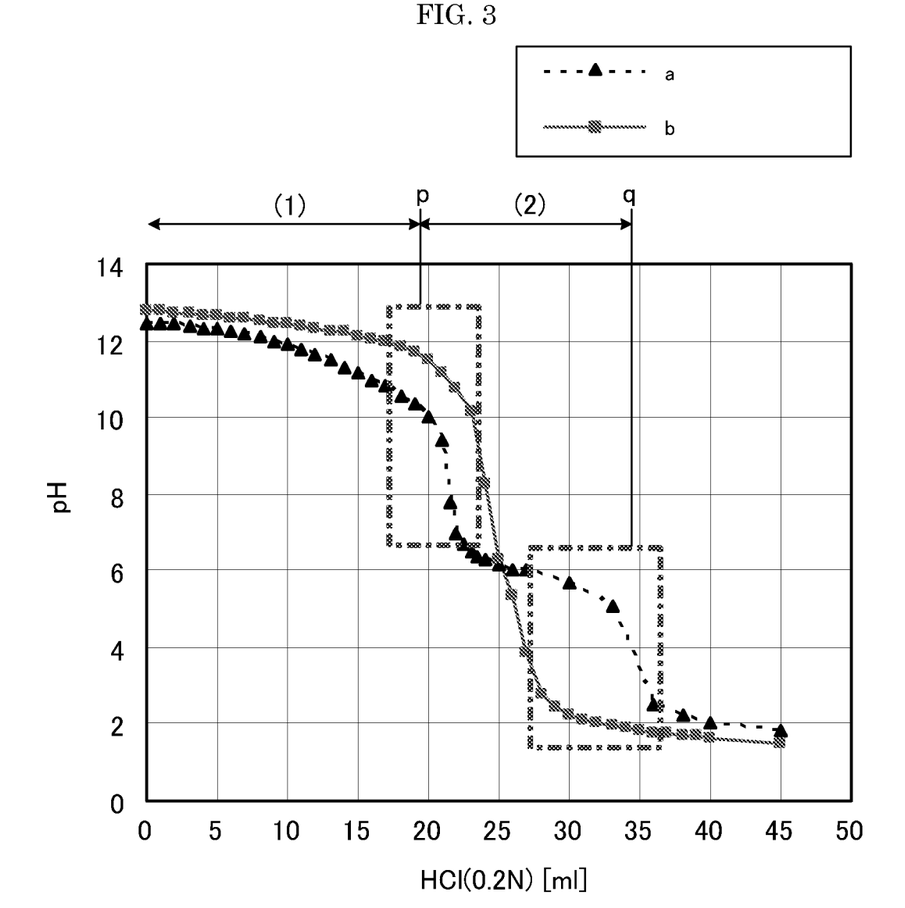
FIG. 3 illustrates titration curves showing pH changes versus the added amounts of HCl for Polyurethane resin emulsion a and Polyurethane resin emulsion b used in Examples.

FIG. 3 illustrates titration curves showing pH changes versus the added amounts of HCl for Polyurethane resin emulsion a and Polyurethane resin emulsion b used in Examples.

Figure 4:
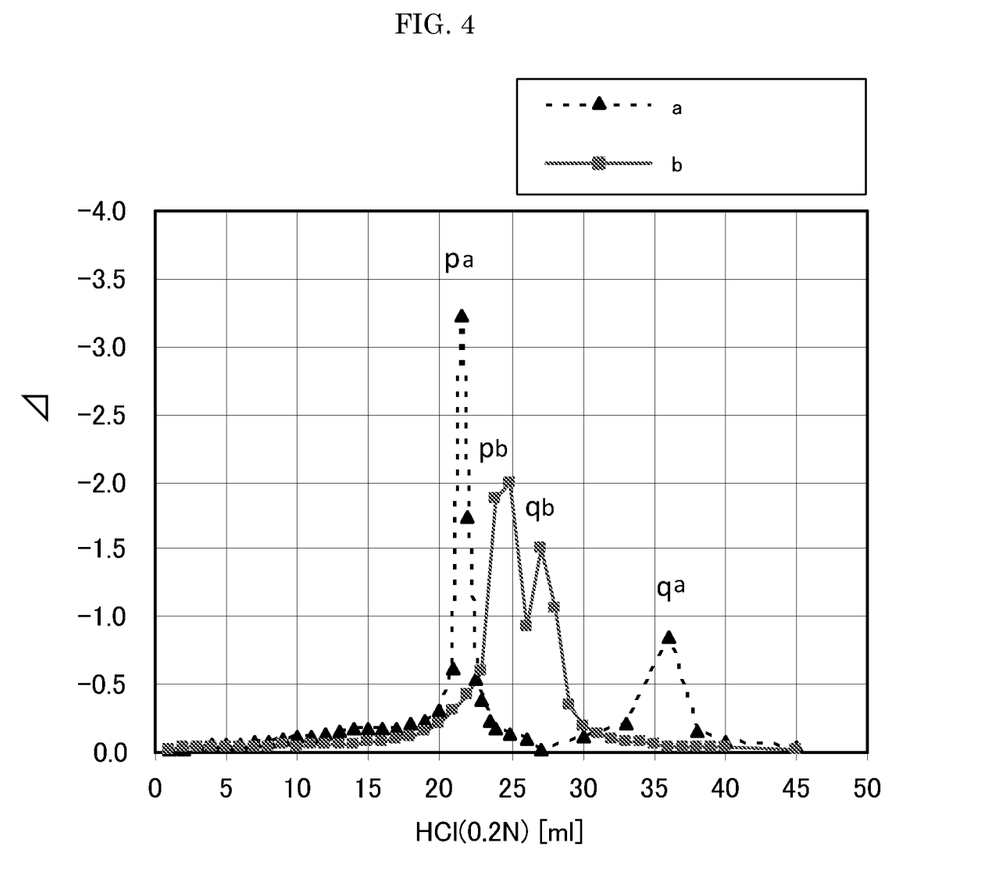
FIG. 4 illustrates differentiated titration curves of FIG. 3.

FIG. 4 illustrates differentiated titration curves of FIG. 3.

FIG. 3 illustrates titration curves showing pH changes versus the added amounts of HCl. In this graph, a dashed line denotes Polyurethane resin emulsion a and a solid line denotes Polyurethane resin emulsion b. In FIG. 3, the area p enclosed by an alternate long and short dash line denotes the first equivalent points of Polyurethane resin emulsion a and Polyurethane resin emulsion b, and the area q denotes the second equivalent points. In the range indicated by (1), NaOH is neutralized; and in the range indicated by (2), —COOH group is neutralized. FIG. 4 illustrates titration curves of FIG. 3 which is differentiated for the purpose of determining inflection points. Polyurethane resin emulsion a indicated by an alternate long and short dash line has the first equivalent point pa and the second equivalent point qa. Polyurethane resin emulsion b indicated by a solid line has the first equivalent point pb and the second equivalent point qb. In FIG. 4, amounts of —COOH group can be calculated from the added amounts of HCl required to reach the second equivalent point from the first equivalent point.

The amounts of —COOH group were calculated with taking active component ratios in water-soluble resins into account. Based on FIG. 4, the acid group amount of Polyurethane resin emulsion a was found to be 2.07 meq/g, and the acid group amount of Polyurethane resin emulsion b was found to be 0.30 meq/g.

An amount of the resin particles contained in the ink is preferably 1% by mass to 10% by mass, more preferably 2% by mass to 8% by mass. In the case of the amount falling within the above-described range, the capability to retain a solid component (e.g., pigment) on the surface of the recording medium can be suitably achieved. Additionally, the ink having excellent storage stability and ejection stability can be provided.

Use of a combination of the water-soluble organic solvent consisting of the amide compound having the I/O value falling within the range of 1.1 to 2.0 with the resin particles having a large acid group amount makes it possible to improve the separability of the solvent from the resin. The separability is further increased by increasing hydrophilicity of the surface of the recording medium through the pretreatment with plasma. As a result, the resin component and the solid pigment component remain on the surface of the recording medium, and, on the other hand, the solvent component permeates the coat layer. Meanwhile, the surface of the recording medium is roughened through the pretreatment with plasma, so that permeation of the liquid component is accelerated. The water-soluble organic solvent is highly lipophilic and has a low surface tension, so that roughening the surface of the recording medium further accelerates permeation of the solvent. Additionally, the extent of separation of the solvent from the resin component and the solid pigment component is dramatically improved. The resin component and the pigment component remaining on the surface of the recording medium are dispersed in an aqueous solution with the components being negatively charged, and neutralized with a cation component (e.g., H+) generated from the medium through the pretreatment with plasma to thereby aggregate together. A combination of the accelerated permeation of the solvent component through the separation from the resin component with the aggregation of the resin and the pigment component on the surface of the recording medium can greatly improve the beading. Use of an ink effective for the pretreatment process with plasma dramatically improves the beading resulting from bleeding of the liquid component on the surface of the recording medium. Therefore, an equivalent effect to conventional one can be achieved with lower pretreatment energy.

<Pigment>

A pigment which may be used in a preferable aspect of the present invention includes a hydroxyl group-modified pigment containing hydroxyl group-containing polymer particles and a water-insoluble or poorly water-soluble color material, i.e., hydroxyl group-modified polymer emulsion.

Examples of other pigments include an organic pigment and an inorganic pigment. Examples of a pigment for monochrome printing include carbon blacks (C.I. Pigment Black 7) (e.g., furnace black, lamp black, acetylene black, and channel black); metals (e.g., copper, iron (C.I. Pigment Black 11), and titanium oxide); and an organic pigment (e.g., aniline black (C.I. Pigment Black 1)).

Examples of a pigment for color printing include, but not limited thereto, C. I. Pigment Yellow 1 (Fast Yellow G), 3, 12 (Disazo Yellow AAA), 13, 14, 17, 24, 34, 35, 37, 42 (yellow iron oxide), 53, 55, 81, 83 (Disazo Yellow HR), 95, 97, 98, 100, 101, 104, 108, 109, 110, 117, 120, 138, and 153; C. I. Pigment Orange 5, 13, 16, 17, 36, 43, and 51; C. I. Pigment Red 1, 2, 3, 5, 17, 22 (Brilliant Fast Scarlet), 23, 31, 38, 48:2 (Permanent Red B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G Lake), 83, 88, 101 (red oxide), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rhodamine Lake), 3, 5:1, 16, 19 (Quinacridone Red), 23, and 38; C. I. Pigment Blue 1, 2, 15 (Phthalocyanine Blue R), 15:1, 15:2, 15:3 (Phthalocyanine Blue G), 15:4, 15:6 (Phthalocyanine Blue E), 16, 17:127 (Prussian Blue), 28 (Cobalt Blue), 29 (Ultramarine), 56, 60, and 63; and C. I. Pigment Green 1, 4, 7, 8, 10, 17, 18, and 36. These pigments may be used alone or in combination.

An amount of the pigment is preferably 1% by mass to 50% by mass. Preferably, the hydroxyl group-modified pigment is contained in an amount of 1% by mass to 40% by mass, more preferably 5% by mass to 35% by mass.

<Water>

As for the water, pure water (e.g., ion-exchanged water, ultrafiltration water, Milli-Q water, and distilled water) or ultrapure water can be used. An amount of the water contained in the ink is not particularly limited and may be appropriately selected depending on the intended purpose.

<Surfactant>

The surfactant preferably does not impair dispersion stability regardless of a type of the colorant or a combination of the water-soluble organic solvents and has low surface tension, high permeability, and high leveling ability. A suitable surfactant is at least one selected from the group consisting of an anionic surfactant, a nonionic surfactant, a silicone-based surfactant, and a fluorosurfactant.

Examples of the anionic surfactant include a surfactant selected from the group consisting of alkyl sulfonate, alkyl benzene sulfonate, alkyl naphthalene sulfonate, a sodium naphthalene sulfonate-formaldehyde condensate, alkane- or olefin-sulfonate, alkyl sulfuric acid ester, a polyoxyethylene alkyl- or alkyl aryl ether-sulfuric acid ester salt, alkyl phosphate, alkyl diphenyl ether disulfonate, ether carboxylate, alkyl sulfosuccinate, α-sulfo fatty acid ester, and a fatty acid salt; a condensate of a higher fatty acid with an amino acid; and naphthenate.

Aromatic sulfonate is produced by introducing a sulfonic acid group into an aromatic compound, followed by neutralizing with a basic compound. Examples of the aromatic sulfonate include those in which benzene sulfonic acid, p-toluene sulfonic acid, naphthalene sulfonic acid, or alkyl naphthalene sulfonic acid is neutralized with alkylamine (e.g., butylamine and triethylamine), alkanolamine (e.g., monoethanolamine, diethanolamine, triethanolamine, and triisopropanolamine), morpholine, aqueous ammonia, sodium hydroxide, lithium hydroxide, potassium hydroxide, aminomethyl propanediol, aminoethyl propanediol, or choline. Alternatively, a buffer (e.g., tris hydroxymethyl aminomethane and Good's buffer) may be used as the basic compound.

Examples of the nonionic surfactant include polyoxyethylene alkyl ether (e.g., polyoxyethylene lauryl ether, polyoxyethylene myristyl ether, polyoxyethylene cetyl ether, polyoxyethylene stearyl ether, and polyoxyethylene oleyl ether), a polyoxyethylene alkylphenyl ether (e.g., polyoxyethylene octylphenyl ether, and polyoxyethylene nonylphenyl ether), polyoxyethylene-α-naphthyl ether, polyoxyethylene-β-naphthyl ether, polyoxyethylene monostyrylphenyl ether, polyoxyethylene distyrylphenyl ether, polyoxyethylene alkylnaphthyl ether, polyoxyethylene monostyrylnaphthyl ether, polyoxyethylene distyrylnaphthyl ether, and a polyoxyethylene-polyoxypropylene block copolymer.

The fluorosurfactant is preferably those in which 2 to 16 carbon atoms are substituted with fluorine, more preferably those in which 4 to 16 carbon atoms are substituted with fluorine. When the number of carbon atoms substituted with fluorine is less than 2, a fluorination effect may be attained. When the number of carbon atoms substituted with fluorine is more than 16, a problem, for example, regarding storage stability of the ink may be caused.

Examples of the fluorosurfactant include a perfluoroalkyl sulfonic acid compound, a perfluoroalkyl carboxylic acid compound, a perfluoroalkyl phosphoric acid ester compound, a perfluoroalkyl ethylene oxide adduct, and a polyoxyalkylene ether polymer compound having a perfluoroalkyl ether group in a side chain thereof. Among them, the polyoxyalkylene ether polymer compound having a perfluoroalkyl ether group in a side chain thereof is preferable from the viewpoint of low foaming property.

Examples of the perfluoroalkyl sulfonic acid compound include perfluoroalkyl sulfonic acid and perfluoroalkyl sulfonic acid salt.

Examples of the perfluoroalkyl carboxylic acid compound include perfluoroalkyl carboxylic acid and perfluoroalkyl carboxylic acid salt.

Examples of the perfluoroalkyl phosphoric acid ester compound include perfluoroalkyl phosphoric acid ester and perfluoroalkyl phosphoric acid ester salt.

Examples of the polyoxyalkylene ether polymer compound having a perfluoroalkyl ether group in a side chain thereof include polyoxyalkylene ether polymer having a perfluoroalkyl ether group in a side chain thereof, a sulfuric acid ester salt of polyoxyalkylene ether polymer having a perfluoroalkyl ether group in a side chain thereof, and a salt of polyoxyalkylene ether polymer having a perfluoroalkyl ether group in a side chain thereof.

Examples of a counter ion of the salt in these fluorosurfactants include Li, Na, K, $NH_4$, $NH_3CH_2CH_2OH$, $NH_2(CH_2CH_2OH)_2$, and $NH(CH_2CH_2OH)_3$.

The fluorosurfactant may be appropriately synthesized or a commercially available product.

Examples of the commercial product thereof include SURFLON S-111, S-112, S-113, S-121, S-131, S-132, S-141, and S-145 (all manufactured by ASAHI GLASS CO., LTD.); FLOURAD FC-93, FC-95, FC-98, FC-129, FC-135, FC-170C, FC-430, and FC-431 (all manufactured by Sumitomo 3M Limited); MEGAFACE F-470, F-1405, and F-474 (all manufactured by DIC CORPORATION); ZONYL TBS, FSP, FSA, FSN-100, FSN, FSO-100, FSO, FS-300, and UR (all manufactured by E. I. du Pont de Nemours and Company); FT-110, FT-250, FT-251, FT-400S, FT-150, and FT-400SW (all manufactured by NEOS COMPANY LIMITED); and POLYFOX PF-151N (all manufactured by Omnova Solutions, Inc.). Among them, particularly preferred are FS-300 (manufactured by E. I. du Pont de Nemours and Company), FT-110, FT-250, FT-251, FT-400S, FT-150, and FT-400SW (all manufactured by NEOS COMPANY LIMITED), and POLYFOX PF-151N (manufactured by Omnova Solutions, Inc.) from the viewpoints of excellent printing quality and, in particular, improvements in color development and levelness of dyeing on paper.

The silicone-based surfactant is not particularly limited and may be appropriately selected depending on the intended purpose, but is preferably those which are not decomposed even at a high pH. Examples thereof include side chain-modified polydimethylsiloxane, both terminal-modified polydimethylsiloxane, one terminal-modified polydimethylsiloxane, and side chain and both terminal-modified polydimethylsiloxane. Particularly preferable is a polyether-modified silicone-based surfactant containing a polyoxyethylene group or polyoxyethylene polyoxypropylene group as a modified group from the viewpoint of an excellent property as an aqueous surfactant.

The silicone-based surfactant may be appropriately synthesized or a commercially available product.

The commercially available product is available, for example, from BYK Japan K.K., Shin-Etsu Chemical Co., Ltd., and Dow Corning Toray Co., Ltd.

The polyether-modified silicone-based surfactant is not particularly limited and may be appropriately selected depending on the intended purpose. Examples thereof include polyoxyethylene alkylether acetate, dodecylbenzene sulfonate, laurate, and polyoxyethylene alkylether sulfate.

An amount of the surfactant contained in the ink is preferably 0.01% by mass to 3.0% by mass, more preferably 0.5% by mass to 2% by mass. When the amount is less than 0.01% by mass, there may be no effect of the addition of the surfactant. When the amount is more than 3.0% by mass, there may be no beading prevention effect with the plasma pretreatment.

<Other Components>

The other components are not particularly limited and may be appropriately selected depending on the intended purpose. Examples thereof include a pH regulator and an antiseptic-antifungal agent.

The pH regulator is not particularly limited and may be appropriately selected depending on the intended purpose, as long as it does not adversely affect an ink to be prepared, and can adjust pH of the ink to 7 to 11. Examples thereof include alcohol amines, a hydroxide of an alkali metal element, a hydroxide of ammonium, phosphonium hydroxide, and a carbonate of alkali metal. When the pH is less than 7 or more than 11, an inkjet head or an ink feeding unit may be eroded away in a large amount, potentially leading to failure such as deterioration, leakage, and ejection failure of the resultant ink.

Examples of the alcohol amines include diethanolamine, triethanolamine, and 2-amino-2-ethyl-1,3-propanediol.

Examples of the hydroxide of an alkali metal element include lithium hydroxide, sodium hydroxide, and potassium hydroxide.

Examples of the hydroxide of ammonium include ammonium hydroxide, quaternary ammonium hydroxide, and quaternary phosphonium hydroxide.

Examples of carbonate of alkali metal include lithium carbonate, sodium carbonate, and potassium carbonate.

Examples of the antiseptic-antifungal agent include sodium dehydroacetate, sodium sorbate, sodium 2-pyridinethiol-1-oxide, sodium benzoate, and sodium pentachlorophenol.

<Preparation and Physical Properties of Ink>

The ink is produced by dispersing or dissolving, into an aqueous medium, a pigment, water, a water-soluble organic solvent, resin particles, and water; and optionally a pigment dispersing agent, surfactant, and other components, optionally followed by stirring and mixing. The dispersing can be performed, for example, by a sand mill, a homogenizer, a ball mill, a paint shaker, or an ultrasonic disperser. The stirring and mixing can be performed by an agitator using a typical agitating blade, a magnetic stirrer, or a high-speed disperser.

Physical properties of the ink are not particularly limited and may be appropriately selected depending on the intended purpose. For example, viscosity, surface tension, and pH thereof preferably fall within the following ranges.

The viscosity of the ink at 25° C. is preferably 5 mPa·s to 25 mPa·s. When the viscosity of the ink is 5 mPa·s or more, an effect of improving print density and quality of printed characters can be attained. When the viscosity of the ink is 25 mPa·s or less, excellent ejection ability can be ensured.

The viscosity can be measured at 25° C., for example, by means of a viscometer (RE-550L, manufactured by Toki Sangyo Co., Ltd.).

The surface tension of the ink is preferably 35 mN/m or lower, more preferably 32 mN/m or lower at 25° C. When the surface tension falls within the above range, drying time can be preferably shortened.

The pH of the ink is preferably 7 to 12, more preferably 8 to 11 from the viewpoint of corrosion protection of a metal member contacting therewith.

<Recording Medium>

Coat paper is exemplified as the recording medium in Examples of the present invention for facilitating the understanding, but the present invention is not limited thereto. For example, the recording medium may be plain paper of which surface is coated with cellulose; and those on which an image can be formed with ink and of which surface is coated with a resin material (e.g., special paper for inkjet printing, laminated paper, an OHP sheet, and a synthetic resin film). Of course, the recording medium is preferably has paper feedability through the image forming apparatus and conveyability in the apparatus. These recording media will now be specifically described.

Existing coated paper for printing refers to coated paper that is used in commercial printing such as so-called art paper (A0, A1), A2 coat paper, A3 coat paper, B2 coat paper, light-weight coat paper, and ultra light weight coated paper; and used for offset printing and gravure printing.

There has frequently been found in articles a formulation of a coat layer of so-called common paper for commercial printing which contains about 10 parts by mass to about 15 parts by mass of a binder (e.g., resin, emulsion, or starch) relative to 100 parts by mass of an inorganic pigment (e.g., kaolin or calcium carbonate).

Specific examples of commercially available products of the art paper include OK KANEFUJI N, SA KANEFUJI N, SATIN KANEFUJI N, ULTRASATIN KANEFUJI N, ULTRA OK KANEFUJI N, and KANEFUJI ONE SIDE (all manufactured by Oji Paper Co., Ltd.); NPI SPECIAL ART, NPI SUPER ART, NPI SUPER DULL, and NPI DULL ART (all manufactured by Nippon Paper Industries Co., Ltd.); UTRILLO SUPER ART, UTRILLO SUPER DULL, and UTRILLO PREMIUM (all manufactured by Daio Paper Corporation); HIGH-QUALITY ART, TOKUHISHI ART, SUPER MAT ART A, and HIGH-QUALITY DULL ART A (all manufactured by Mitsubishi Paper Mills Ltd.); and RAICHO SUPER ART N, RAICHO SPECIAL ART, and RAICHO DULL ART N (all manufactured by Chuetsu Pulp & Paper Co., Ltd.).

Specific examples of commercially available products of the A2 coat paper include OK TOP COAT+ (PLUS), OK CASABLANCA, OK TRINITY, NEW AGE, OK TOP COAT MAT N, OK ROYAL COAT, OK TOP COAT DULL, Z COAT, OK KASAHIME, OK KASAO, OK KASAO SATIN, OK TOP COAT+, OK NON-WRINKLE, OK COAT V, OK COAT N GREEN 100, OK MAT COAT GREEN 100, NEW AGE GREEN 100, and Z COAT GREEN 100 (all manufactured by Oji Paper Co., Ltd.); AURORA COAT, SHIRAOI MAT, IMPERIAL MAT, SILVER DIAMOND, RECYCLE COAT 100, and CYCLE MAT 100 (all manufactured by Nippon Paper Industries Co., Ltd.); MU COAT, MU WHITE, MU MAT, and WHITE MU MAT (all manufactured by Hokuetsu Paper Mills Ltd.); RAICHO COAT N, REGINA RAICHO COAT 100, RAICHO MAT COAT N, and REGINA RAICHO MAT 100 (all manufactured by Chuetsu Pulp & Paper Co., Ltd.); PEARL COAT, WHITE PEARL COAT N, NEW V MAT, WHITE NEW V MAT, PEARL COAT REW, WHITE PEARL COAT NREW, NEW V MAT REW, and WHITE NEW V MAT REW (all manufactured by Mitsubishi Paper Mills Ltd.).

Specific examples of commercially available products of the A3 coat (light-weight coat) paper include OK COAT L, ROYAL COAT L, OK COAT LR, OK WHITE L, OK ROYAL COAT LR, OK COAT L GREEN 100, and OK MAT COAT L GREEN 100 (all manufactured by Oji Paper Co., Ltd.); EASTER DX, RECYCLE COAT L100, AURORA L, RECYCLE MAT L100, and <SSS> ENERGY WHITE (all manufactured by Nippon Paper Industries Co., Ltd.); UTRILLO COAT L, and MATISSE COAT (all manufactured by Daio Paper Corporation); HI ALPHA, ALPHA MAT, (N) KINMARI L, and KINMARI HIL (all manufactured by Hokuetsu Paper Mills Ltd.); N PEARL COAT L, N PEARL COAT LREW, and SWING MAT REW (all manufactured by Mitsubishi Paper Mills Ltd.); SUPER EMINE, EMINE, and CHATON (all manufactured by Chuetsu Pulp & Paper Co., Ltd.).

Specific examples of commercially available products of the B2 coat (medium-quality coat) paper include OK MEDIUM QUALITY COAT, (F) MCOP, OK ASTRO GLOSS, OK ASTRO DULL, and OK ASTRO MAT (all manufactured by Oji Paper Co., Ltd.); and KING 0 (manufactured by Nippon Paper Industries Co., Ltd.).

Specific examples of commercially available products of the ultra light weight coated paper include OK ROYAL LIGHT S GREEN 100, OK EVER LIGHT COAT, OK ULTRA LIGHT WEIGHT COATED SUPER ECO G, OK ULTRA LIGHT WEIGHT COATED MAT ECO G100, OK STAR LIGHT COAT, OK SOFT ROYAL, OK BRIGHT, CLEAN HIT G, YAMAYURI BRIGHT, YAMAYURI BRIGHT G, OK AQUA LIGHT COAT, OK BRIGHT (ROUGH, GLOSS), SNOW MAT DX, OK KASAHIME, and OK KASAYURI (all manufactured by Oji Paper Co., Ltd.); PYRENE DX, PEGASUS HYPER 8, AURORA S, SUPER ANDES DX, SPACE DX, SEINE DX, SPECIAL GRAVURE DX, PEGASUS, SILVER PEGASUS, SUPER GREENLAND DX100, <SSS> ENERGY SOFT, <SSS> ENERGY LIGHT, and EE HENRY (all manufactured by Nippon Paper Industries Co., Ltd.); KANT EXCEL, EXCEL SUPER B, EXCEL SUPER C, UTRILLO EXCEL, and HEINE EXCEL (all manufactured by Daio Paper Corporation); COSMO ACE (manufactured by Nippon Daishowa Paperboard Co., Ltd.); HI BETA, HI GAMMA, SHIRO- MARI L, WHITE HAMMING, and SEMI-JO (all manufactured by Hokuetsu Paper Mills Ltd.); RUBY LIGHT HREW, PEARL SOFT, and RUBY LIGHT H (all manufactured by Mitsubishi Paper Mills Ltd.); CHATON, ARISO, and SMASH (all manufactured by Chuetsu Pulp & Paper Co., Ltd.); and STAR CHERRY, and CHERRY SUPER (all manufactured by Marusumi Paper Co., Ltd.).

<Effect of Ink and Plasma Pretreatment Against Offset Coat Paper>

In the plasma treatment serving as an acidification treatment means (process), a treatment object is irradiated with plasma in the air to thereby allow a polymer on a surface of the treatment object to react. As a result, a hydrophilic functional group is formed.

Figure 5:
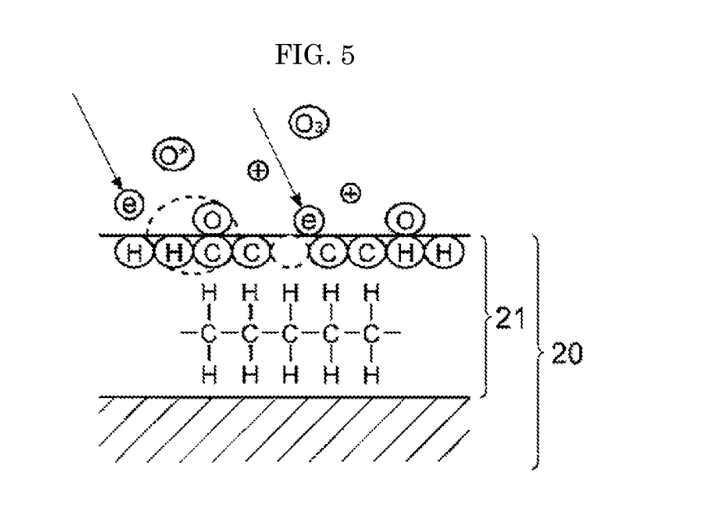
FIG. 5 is a diagram illustrating formation of a hydrophilic functional group using a plasma treatment unit (treatment device) of the present invention by irradiating a treatment object (recording medium) with plasma in the air to thereby allow a polymer on a surface of the treatment object to react.

Specifically, as illustrated in FIG. 5, electrons e emitted by a discharge electrode are accelerated in an electric field and cause excitation and ionization of atoms and molecules in the air. The resultant ionized atoms and molecules also emit electrons, so that the number of high-energy electrons is increased to thereby generate streamer discharge (plasma).

The high-energy electrons generated during the streamer discharge cleave bonds within polymers on a surface of a treatment object 20 (e.g., a coat paper) (a coat layer 21 of the coat paper is solidified with calcium carbonate and starch serving as a binder, and the starch has a polymer structure), resulting in rebinding of the resultant cleavage product with oxygen radical O* or ozone $O_3$ in a gas phase. Thus, a polar functional group (e.g., a hydroxyl group or a carboxyl group) is formed on the surface of the treatment object 20. Consequently, the surface of the treatment object 20 is hydrophilized and acidified. The polymer structure in the coat layer 21 is cleaved with plasma, leading to roughening of the surface thereof.

In reference to FIGS. 6 and 7, behavior of ink droplets of Ink A according to an embodiment of the present invention and Reference Ink Ref outside the scope of the present invention before and after plasma pretreatment will be described.

Figure 6:
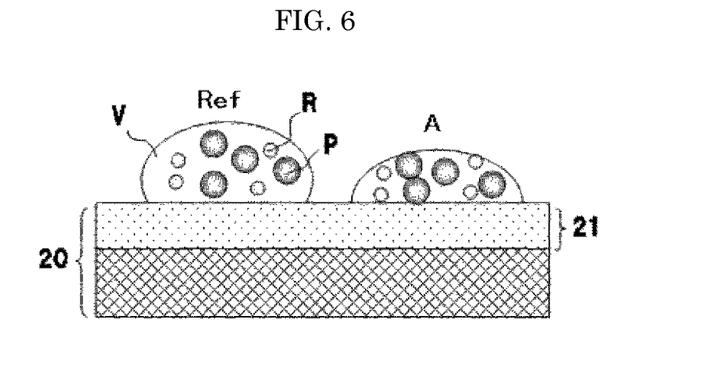
FIG. 6 is a diagram illustrating behavior of ink droplets of Reference ink Ref outside the scope of the present invention and Ink A according to an embodiment of the present invention before plasma pretreatment.

FIG. 6 is a schematic diagram of dots when Reference Ink Ref and Ink A according to the present invention are dropped onto a sheet of offset coat paper 20 which has not been pretreated with plasma. Each ink consists of a pigment P, a resin R, and a vehicle V which is a liquid component containing a water-soluble organic solvent.

In FIG. 6, Reference Ink Ref has poor permeability into the coat layer 21, so that a high proportion of ink droplets remain on the surface of the paper. On the other hand, Ink A contains the vehicle having excellent permeability, so that a proportion of the vehicle remaining on the surface is lower than that of Reference Ink Ref. In the case of a high proportion of the vehicle remains on the surface of the paper, it takes a relatively long time to dry the dot. Furthermore, when another adjacent dot is formed before the dot is fully dried, the dots coalesce together upon impact of the adjacent dot to thereby allow the vehicle and the pigment move between the dots. As a result, uneven coloring or beading due to color mixing which is unintentional in image design may occur.

Figure 7:
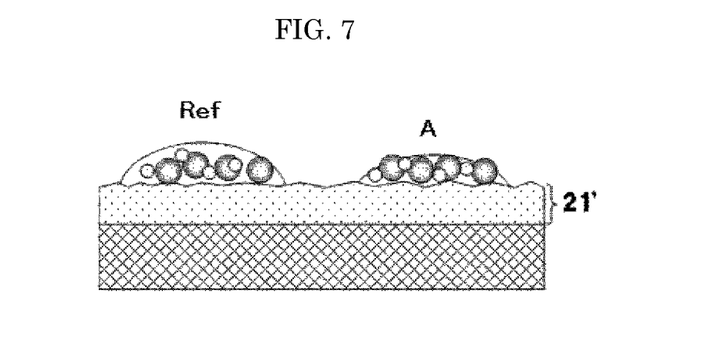
FIG. 7 is a diagram illustrating behavior of ink droplets of Reference ink Ref outside the scope of the present invention and Ink A according to an embodiment of the present invention after plasma pretreatment.

FIG. 7 is a schematic diagram of dots when Reference Ink Ref and Ink A according to the present invention are dropped onto the offset coat paper 20 which has been pretreated with plasma. The polymer structure on the surface 21' of the coat layer of the offset coat paper 20 has been broken down through the pretreatment with plasma to thereby be physically roughened. When an ink is dropped onto the surface, a contact area between the vehicle and the coat layer is increased due to the roughening, so that permeation of the vehicle into the inside of the coat layer is accelerated. The contact area is only slightly increased due to the roughening. However, Ink A contains rather a lipophilic solvent and has low surface tension, so that it is more excellent in permeability than an ink containing a conventional solvent even into the only slightly roughened surface. In addition, the surface layer 21' has an action of agglomerating the pigment P with the resin R because it has been acidified with the plasma pretreatment. The ink droplet of Ink A in which a less liquid component remains on the surface of the paper is thickened through agglomeration to the greater extent than Reference Ink Ref. Even when the adjacent dot is impacted, the vehicle and the pigment do not move between the dots. As a result, Ink A can effectively prevent failure such as beading compared to Reference Ink Ref.

Use of Ink A can achieve an improved beading prevention effect compared to conventional ink. The improved beading prevention effect makes it possible to achieve an equivalent effect to that of the conventional ink even with less energy for the plasma treatment. That is, use of Ink A can contribute to saving of electric power consumption and miniaturization of a device. The plasma treatment improves color development of the ink and decreases an ink deposit amount because the pigment is separated to thereby remain on the surface of the paper.

EXAMPLES

The present invention will now be specifically described in detail with reference to Examples. However, Examples are for facilitating the understanding of the present invention, and the present invention is not limited thereto. As used in Examples, "part(s)" and "%" denote "part(s) by mass" and "% by mass", respectively, unless otherwise specified.

Preparation Example 1

Preparation of Hydroxyl Group-Modified Pigment (Polymer Emulsion Containing Hydroxyl Group-Containing Polymer Particles and a Water-Insoluble or Poorly Water-Soluble Color Material)

(a) Preparation of dispersion of phthalocyanine pigment-containing polymer particles: a blue dispersion of polymer particles was obtained according to Preparation Example 3 of JP-A No. 2001-139849. The resultant polymer particles were found to have the average particle diameter (D50%) of 93 nm as measured by MICRO TRACK UPA (manufactured by NIKKISO CO., LTD.).

Preparation Example 2

(b) Preparation of dispersion of dimethylquinacridone pigment-containing polymer particles: A reddish violet dispersion of polymer particles was obtained in the same manner as in (a), except that Pigment Red 122 was used instead of the phthalocyanine pigment. The resultant polymer particles were found to have the average particle diameter (D50%) of 127 nm as measured by MICRO TRACK UPA (manufactured by NIKKISO CO., LTD.).

Preparation Example 3

(c) Preparation of dispersion of monoazo yellow pigment-containing polymer particles: A yellow dispersion of polymer particles was obtained in the same manner as in Preparation Example 1, except that Pigment Yellow 74 was used instead of the phthalocyanine pigment in (a). The resultant polymer particles were found to have the average particle diameter (D50%) of 76 nm as measured by MICRO TRACK UPA (manufactured by NIKKISO CO., LTD.).

Preparation Example 4

(d) Preparation of dispersion of carbon black-containing polymer particles: A black dispersion of polymer particles was obtained in the same manner as in Preparation Example 1, except that carbon black (FW100, manufactured by Evonik Industries AG) was used instead of the phthalocyanine pigment in (a). The resultant polymer particles were found to have the average particle diameter (D50%) of 104 nm as measured by MICRO TRACK UPA (manufactured by NIKKISO CO., LTD.).

[Production Example of Water-Soluble Organic Solvent 1]

A compound represented by the following Structural Formula (3) was obtained according to Production Example 1 in JP-A No. 2012-107210.

Structural Formula (3)

[Production Example of Water-Soluble Organic Solvent 2]

To a 200 mL three-neck flask equipped with a stirrer, a thermocouple, and a nitrogen gas introducing pipe, were added 49.5 g (0.5 mol) of N,N-dimethylacrylamide, and 20 g (0.63 mol) of methanol. Then, 10 mL of a methanol solution containing 0.5 g (0.009 mol) of sodium methoxide was slowly added dropwise thereto at room temperature with stirring and nitrogen gas being introduced thereinto, while a temperature of the solution is adjusted to 30° C. to 40° C. After 4 hour reaction, the resultant is neutralized with acetic acid, from which an unreacted material is distilled off to thereby obtain a product. The product was found to be a compound represented by the following Structural Formula (2) and to have a yield of 57.6 g (yield rate: 88%) based on an analytical result from nuclear magnetic resonance spectra ($^1$H-NMR and $^{13}$C-NMR).

Structural Formula (2)

[Production of Ink]
(i) Pigment . . . hydroxyl group-modified pigment (polymer emulsion containing hydroxyl group-containing polymer particles and a water-insoluble or poorly water-soluble color material)
(ii) Surfactant (FS-300, manufactured by E. I. du Pont de Nemours and Company, polyoxyalkylene-2-perfluoroalkyl-ethylether)
(iii) Water-soluble organic solvent described below
(iv) Resin emulsion described below
(v) Pure water
(vi) pH Regulator (manufactured by Tokyo Chemical Industry Co., Ltd., 2-amino-2-ethyl-1,3-propanediol)
(vii) Antiseptic agent (PROXEL GXL, manufactured by Avecia Inc, antifungal agent mainly containing 1,2-benzothiazoline-3-on)
(viii) Antifoaming agent (KM72F, manufactured by Shin-Etsu Chemical Co., Ltd., self-emulsifying silicone antifoaming agent)

The above-described (v) pure water, (iii) water-soluble organic solvent, (iv) resin emulsion, (vi) pH regulator, (vii) antiseptic agent, and antifoaming agent were placed into a dissolver (DISPERMAT-FE), followed by dispersing and stirring to thereby produce a resin dispersion liquid. To the resultant resin dispersion liquid, were added (i) pigment and (ii) surfactant in the appropriate amount, followed by dispersing and stirring with the dissolver (DISPERMAT-FE) to thereby produce a pigment dispersion liquid. The resultant pigment dispersion liquid was filtered through a filter having the average pore diameter of 3 µm, which was used as an ink for inkjet recording.

Production Example 1

A cyan pigment-containing dispersion liquid of Preparation Example 1 was used as a pigment. To the water-soluble organic solvent, were added the amide compound represented by the Structural Formula (2) and having the I/O value of 1.96, Polyurethane resin emulsion a having the acid group amount of 2.0 meq/g (the polyurethane resin emulsion "W5661" (manufactured by Mitsui Chemicals, Inc.) of which acid group amount was adjusted to the specified value by varying a hydrophilic group (e.g., carboxylic acid) amount to be introduced during a synthesis process described in the above "Resin emulsion and preparation method thereof"), pure water, the pH regulator, the antiseptic agent, and the antifoaming agent in the quantitative ratio described in Table 1 to thereby obtain an ink of Production Example 1.

Production Example 2

An ink of Production Example 2 was obtained in the same manner as in Production Example 1, except that the water-soluble organic solvent was changed to the amide compound represented by the Structural Formula (3) and having the I/O value of 1.34.

Production Example 3

An ink of Production Example 3 was obtained in the same manner as in Production Example 1, except that the resin emulsion was changed to Polyurethane resin emulsion b having the acid group amount of 2.5 meq/g (the acid group amount thereof was adjusted to the specified value in the same manner as in "Polyurethane resin emulsion a").

Production Example 4

An ink of Production Example 4 was obtained in the same manner as in Production Example 2, except that the resin emulsion was changed to Polyurethane resin emulsion b having the acid group amount of 2.5 meq/g.

Production Example 5

An ink of Production Example 5 was obtained in the same manner as in Production Example 1, except that the pigment dispersion was changed to a magenta-containing dispersion liquid.

Production Example 6

An ink of Production Example 6 was obtained in the same manner as in Production Example 1, except that the pigment dispersion was changed to a yellow-containing dispersion liquid.

Production Example 7

An ink of Production Example 7 was obtained in the same manner as in Production Example 1, except that the pigment dispersion was changed to a black-containing dispersion liquid.

Comparative Production Example 1

An ink of Comparative Production Example 1 was obtained in the same manner as in Production Example 1, except that the water-soluble organic solvent was changed to an amide compound N, N-dimethylformamide having the I/O value of 2.19.

Comparative Production Example 2

An ink of Comparative Production Example 2 was obtained in the same manner as in Production Example 1, except that the water-soluble organic solvent was changed to an aliphatic alcohol 3-methyl-1,3-butanediol.

Comparative Production Example 3

An ink of Comparative Production Example 3 was obtained in the same manner as in Production Example 1, except that the resin emulsion was changed to Polyurethane resin emulsion c having the acid group amount of 1.5 meq/g (the acid group amount thereof was adjusted to the specified value in the same manner as in "Polyurethane resin emulsion a").

Comparative Production Example 4

An ink of Comparative Production Example 4 was obtained in the same manner as in Production Example 1, except that the resin emulsion was changed to Polyurethane resin emulsion d having the acid group amount of 0.30 meq/g (the acid group amount thereof was adjusted to the specified value in the same manner as in "Polyurethane resin emulsion a").

Comparative Production Example 5

An ink of Comparative Production Example 5 was obtained in the same manner as in Production Example 1, except that the resin emulsion was changed to acrylic resin emulsion having the acid group amount of 0.25 meq/g (manufactured by TOYOCHEM CO., LTD., those produced by the method for decreasing coarse particles described in JP-A No. 2011-231219).

Formulations of these inks are summarized in the following Tables 1 and 2.

TABLE 1

| | | Production Example | | | | | | |
|---|---|---|---|---|---|---|---|---|
| | | 1 | 2 | 3 | 4 | 5 | 6 | 7 |
| Pigment dispersion liquid | Cyan pigment-containing dispersion liquid | 26.00 | 26.00 | 26.00 | 26.00 | — | — | — |
| | Magenta pigment-containing dispersion liquid | — | — | — | — | 26.00 | — | — |
| | Yellow pigment-containing dispersion liquid | — | — | — | — | — | 30.00 | — |
| | Black pigment-containing dispersion liquid | — | — | — | — | — | — | 34.00 |
| | Surfactant | 0.5 | 0.5 | 0.5 | 0.5 | 0.5 | 0.5 | 0.5 |
| Water-soluble organic solvent | Amide compound of Structural Formula (2) | 20.00 | — | 20.00 | — | 20.00 | 20.00 | 20.00 |
| | Amide compound of Structural Formula (3) | — | 20.00 | — | 20.00 | — | — | — |
| | N,N-dimethylformamide | — | — | — | — | — | — | — |
| | 3-methyl-1,3-butanediol | — | — | — | — | — | — | — |
| Resin emulsion | Polyurethane resin emulsion a | 5.00 | 5.00 | — | — | 5.00 | 5.00 | 5.00 |
| | Polyurethane resin emulsion b | — | — | 5.00 | 5.00 | — | — | — |
| | Acrylic resin emulsion | — | — | — | — | — | — | — |
| | Pure water | 47.85 | 47.85 | 47.85 | 47.85 | 47.85 | 43.85 | 39.85 |
| | pH regulator | 0.10 | 0.10 | 0.10 | 0.10 | 0.10 | 0.10 | 0.10 |
| | Antiseptic agent | 0.05 | 0.05 | 0.05 | 0.05 | 0.05 | 0.05 | 0.05 |
| | Antifoaming agent | 0.50 | 0.50 | 0.50 | 0.50 | 0.50 | 0.50 | 0.50 |
| | Total (% by mass) | 100.00 | 100.00 | 100.00 | 100.00 | 100.00 | 100.00 | 100.00 |

TABLE 2

| | | Comparative Production Example | | | | |
|---|---|---|---|---|---|---|
| | | 1 | 2 | 3 | 4 | 5 |
| Pigment dispersion liquid | Cyan pigment-containing dispersion liquid | 26.00 | 26.00 | 26.00 | 26.00 | 26.00 |
| | Magenta pigment-containing dispersion liquid | — | — | — | — | — |
| | Yellow pigment-containing dispersion liquid | — | — | — | — | — |
| | Black pigment-containing dispersion liquid | — | — | — | — | — |
| | Surfactant | 0.5 | 0.5 | 0.5 | 0.5 | 0.5 |
| Water-soluble organic solvent | Amide compound of Structural Formula (2) | — | — | 20.00 | 20.00 | 20.00 |
| | Amide compound of Structural Formula (3) | — | — | — | — | — |
| | N,N-dimethylformamide | 20.00 | — | — | — | — |
| | 3-methyl-1,3-butanediol | — | 20.00 | — | — | — |

TABLE 2-continued

|  |  | Comparative Production Example | | | | |
|---|---|---|---|---|---|---|
|  |  | 1 | 2 | 3 | 4 | 5 |
| Resin emulsion | Polyurethane resin emulsion a | 5.00 | 5.00 | — | — | — |
|  | Polyurethane resin emulsion b | — | — | — | — | — |
|  | Polyurethane resin emulsion c | — | — | 5.00 | — | — |
|  | Polyurethane resin emulsion d | — | — | — | 5.00 | — |
|  | Acrylic resin emulsion | — | — | — | — | 5.00 |
|  | Pure water | 47.85 | 47.85 | 47.85 | 47.85 | 47.85 |
|  | pH regulator | 0.10 | 0.10 | 0.10 | 0.10 | 0.10 |
|  | Antiseptic agent | 0.05 | 0.05 | 0.05 | 0.05 | 0.05 |
|  | Antifoaming agent | 0.50 | 0.50 | 0.50 | 0.50 | 0.50 |
|  | Total (% by mass) | 100.00 | 100.00 | 100.00 | 100.00 | 100.00 |

Examples 1 to 7 and Comparative Examples 1 to 12

Image Formation (Printing)

Under controlled environment condition of 23° C.±0.5° C. and 50±5% RH, the inkjet printer (IPSIO GXE-5500, manufactured by Ricoh Company, Ltd.) was used to form an image onto the recording medium (OK TOP COAT+, manufactured by Oji Paper Co., Ltd.) while varying piezo driving voltage so that ink ejection amounts are the same for each ink. Beading was evaluated as follows. Results are shown in Tables 3-1 to 3-3.

Note that, as shown in Tables 3-1 to 3-3, the surfaces of the recording media were brought into contact with plasma by a plasma treatment device at energy for plasma treatment of 0 kJ/m² (untreated), 7 kJ/m², or 14 kJ/m² to thereby reduce the pH values on the surfaces of the recording media. Immediately thereafter, the recording media which had been treated with plasma were fed into the inkjet printer (IPSIO GXE-5500, manufactured by Ricoh Company, Ltd.) to thereby form an image.

[Beading Evaluation]

Ink droplets of 21 pl were used to print solid images of 2 centimeters square with 100 duty, which were evaluated for beading. Results are shown in Tables 3-1 to 3-3.

[Beading Evaluation Criteria]

A: No beading was observed.

B: Slight beading was observed.

C: Beading was observed and uneven images were formed.

D: Significant beading was observed, which was unacceptable.

TABLE 3-1

|  |  | Plasma treatment energy | |
|---|---|---|---|
|  | Ink | 7 kJ/m² | 14 kJ/m² |
| Example 1 | Production Example 1 | A | A |
| Example 2 | Production Example 2 | A | A |
| Example 3 | Production Example 3 | A | A |
| Example 4 | Production Example 4 | A | A |
| Example 5 | Production Example 5 | A | A |
| Example 6 | Production Example 6 | A | A |
| Example 7 | Production Example 7 | A | A |

TABLE 3-2

|  |  | Plasma treatment energy | | |
|---|---|---|---|---|
|  | Ink | 0 kJ/m² | 7 kJ/m² | 14 kJ/m² |
| Comparative Example 1 | Comparative Production Example 1 | B | B | B |
| Comparative Example 2 | Comparative Production Example 2 | C | B | B |
| Comparative Example 3 | Comparative Production Example 3 | B | B | A |
| Comparative Example 4 | Comparative Production Example 4 | C | C | B |
| Comparative Example 5 | Comparative Production Example 6 | D | C | B |

TABLE 3-3

|  | Ink | Plasma treatment energy 0 kJ/m² |
|---|---|---|
| Comparative Example 6 | Production Example 1 | B |
| Comparative Example 7 | Production Example 2 | B |
| Comparative Example 8 | Production Example 3 | B |
| Comparative Example 9 | Production Example 4 | B |
| Comparative Example 10 | Production Example 5 | B |
| Comparative Example 11 | Production Example 6 | B |
| Comparative Example 12 | Production Example 7 | B |

Note that, when the coated paper LUMIART GLOSS 90 gsm (manufactured by Stora Enso Oyj) was used as the recording medium instead of the "OK TOP COAT+, manufactured by Oji Paper Co., Ltd." and the beading was evaluated in the same manner as above, equivalent results were obtained according to the beading evaluation criteria A to D, although the extent of beading is only slightly inferior to that of the "OK TOP COAT+, manufactured by Oji Paper Co., Ltd."

Embodiments of the present invention are as follows.

<1> An image forming apparatus, including:
  a pretreatment unit configured to bring a surface of a recording medium into contact with plasma; and
  an image forming unit configured to eject an ink onto the recording medium to thereby form an image;
  wherein the ink contains a pigment, water, a water-soluble organic solvent, and resin particles,
  wherein the water-soluble organic solvent is an amide compound having an inorganic/organic value (I/O value) of 1.1 to 2.0, and
  wherein the resin particles are ether-based polyurethane resin particles and have an acid group amount of 2.0 meq/g or more.

<2> The image forming apparatus according to <1>, wherein the water-soluble organic solvent is an amide compound represented by the following General Formula (I):

General Formula (I)

wherein R denotes an alkyl group having 1 to 6 carbon atoms.

<3> The image forming apparatus according to <1> or <2>, wherein an amount of the amide compound contained in the ink is 1% by mass to 40% by mass.

<4> The image forming apparatus according to any one of <1> to <3>, wherein the pigment is a hydroxyl group-modified pigment containing hydroxyl group-containing polymer particles and a water-insoluble or poorly water-soluble color material.

<5> The image forming apparatus according to any one of <1> to <4>, wherein the recording medium is offset coat paper which includes a support and a coating layer on at least one surface of the support.

<6> The image forming apparatus according to any one of <1> to <5>, wherein the pretreatment unit is unit configured to bring the surface of the recording medium into contact with plasma to thereby decrease a pH value of the surface.

<7> An image forming method, including:
pretreating a surface of a recording medium by bringing the surface into contact with plasma; and
ejecting an ink onto the recording medium to thereby form an image;
wherein the ink contains a pigment, water, a water-soluble organic solvent, and resin particles,
wherein the water-soluble organic solvent is an amide compound having an inorganic/organic value (I/O value) of 1.1 to 2.0, and
wherein the resin particles are ether-based polyurethane resin particles and have an acid group amount of 2.0 meq/g or more.

<8> The image forming method according to <7>, wherein the water-soluble organic solvent is an amide compound represented by the following General Formula (I):

General Formula (I)

wherein R denotes an alkyl group having 1 to 6 carbon atoms.

<9> The image forming method according to <7> or <8>, wherein an amount of the amide compound contained in the ink is 1% by mass to 40% by mass.

<10> The image forming method according to any one of <7> to <9>, wherein the pigment is a hydroxyl group-modified pigment containing hydroxyl group-containing polymer particles and a water-insoluble or poorly water-soluble color material.

<11> The image forming method according to any one of <7> to <10>, wherein the recording medium is offset coat paper which includes a support and a coating layer on at least one surface of the support.

<12> The image forming apparatus according to any one of <7> to <11>, wherein the pretreating is bringing the surface of the recording medium into contact with plasma to thereby decrease a pH value of the surface.

This application claims priority to Japanese application No. 2014-008312, filed on Jan. 21, 2014 and incorporated herein by reference, and Japanese application No. 2014-227686, filed on Nov. 10, 2014 and incorporated herein by reference.

What is claimed is:

1. An image forming apparatus, comprising:
a pretreatment unit configured to bring a surface of a recording medium into contact with plasma; and
an image forming unit configured to eject an ink onto the recording medium to thereby form an image;
wherein the ink contains a pigment, water, a water-soluble organic solvent, and resin particles,
wherein the water-soluble organic solvent is an amide compound having an inorganic/organic value (I/O value) of 1.1 to 2.0, and
wherein the resin particles are ether-based polyurethane resin particles and have an acid group amount of 2.0 meq/g or more.

2. The image forming apparatus according to claim 1, wherein the water-soluble organic solvent is an amide compound represented by the following General Formula (I):

General Formula (I)

wherein R denotes an alkyl group having 1 to 6 carbon atoms.

3. The image forming apparatus according to claim 1, wherein an amount of the amide compound contained in the ink is 1% by mass to 40% by mass.

4. The image forming apparatus according to claim 1, wherein the pigment is a hydroxyl group-modified pigment containing hydroxyl group-containing polymer particles and a water-insoluble or poorly water-soluble color material.

5. The image forming apparatus according to claim 1, wherein the recording medium is offset coat paper which comprises a support and a coating layer on at least one surface of the support.

6. The image forming apparatus according to claim 1, wherein the pretreatment unit is unit configured to bring the surface of the recording medium into contact with plasma to thereby decrease a pH value of the surface.

7. An image forming method, comprising:
pretreating a surface of a recording medium by bringing the surface into contact with plasma; and
ejecting an ink onto the recording medium to thereby form an image;
wherein the ink contains a pigment, water, a water-soluble organic solvent, and resin particles,
wherein the water-soluble organic solvent is an amide compound having an inorganic/organic value (I/O value) of 1.1 to 2.0, and
wherein the resin particles are ether-based polyurethane resin particles and have an acid group amount of 2.0 meq/g or more.

8. The image forming method according to claim 7, wherein the water-soluble organic solvent is an amide compound represented by the following General Formula (I):

Gerneral Formula (I)

wherein R denotes an alkyl group having 1 to 6 carbon atoms.

9. The image forming method according to claim 7, wherein an amount of the amide compound contained in the ink is 1% by mass to 40% by mass.

10. The image forming method according to claim 7, wherein the pigment is a hydroxyl group-modified pigment containing hydroxyl group-containing polymer particles and a water-insoluble or poorly water-soluble color material.

11. The image forming method according to claim 7, wherein the recording medium is offset coat paper which comprises a support and a coating layer on at least one surface of the support.

12. The image forming apparatus according to claim 7, wherein the pretreating is bringing the surface of the recording medium into contact with plasma to thereby decrease a pH value of the surface.

\* \* \* \* \*